United States Patent
Karimelahi et al.

(10) Patent No.: US 12,360,406 B2
(45) Date of Patent: Jul. 15, 2025

(54) MULTI-DOPED SLAB SILICON OPTICAL MODULATOR

(71) Applicant: MARVELL ASIA PTE, LTD., Singapore (SG)

(72) Inventors: Samira Karimelahi, San Jose, CA (US); Masaki Kato, Palo Alto, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 573 days.

(21) Appl. No.: 17/113,463

(22) Filed: Dec. 7, 2020

(65) Prior Publication Data

US 2022/0179245 A1 Jun. 9, 2022

(51) Int. Cl.
*G02F 1/025* (2006.01)

(52) U.S. Cl.
CPC ........ *G02F 1/025* (2013.01); *G02F 2201/063* (2013.01)

(58) Field of Classification Search
CPC ........................... G02F 1/025; G02F 2201/063
USPC ........................................................ 385/1–3
See application file for complete search history.

(56) References Cited

U.S. PATENT DOCUMENTS

| | | | | |
|---|---|---|---|---|
| 6,298,177 B1* | 10/2001 | House | ............... | G02F 1/025 |
| | | | | 385/3 |
| 10,866,440 B1* | 12/2020 | Cho | ............... | G02F 1/025 |
| 2006/0008223 A1* | 1/2006 | Gunn | ............... | G02F 1/025 |
| | | | | 385/129 |
| 2008/0159680 A1* | 7/2008 | Gill | ............... | G02F 1/3133 |
| | | | | 385/130 |
| 2016/0202503 A1* | 7/2016 | Chen | ............... | G02B 6/134 |
| | | | | 385/3 |
| 2020/0124883 A1* | 4/2020 | Delisle-Simard | ....... | G02F 1/025 |
| 2022/0026747 A1* | 1/2022 | Chen | ............... | G02F 1/025 |

OTHER PUBLICATIONS

Lecture 8 of Physics 272 "Electric Currents Resistance & Resistivity" course at University of Hawaii (Year: 2010).*

* cited by examiner

*Primary Examiner* — Robert Tavlykaev

(57) ABSTRACT

A silicon optical modulator with improved bandwidth includes a silicon waveguide with a rib structure in cross section connected to a first slab region and a second slab region respectively on two opposite sides of the rib structure. The silicon optical modulator further includes a PN junction formed in the rib structure with a P-type part joined with the first slab region and a N-type part joined with the second slab region. Additionally, the silicon optical modulator includes multiple P-type doped sections formed one next to another in the first slab region ended with a first end region and multiple N-type doped sections one next to another formed in the second slab region ended with a second end region. The multiple P-type or N-type doped sections are configured with increasing doping levels for sections further away from the rib structure.

6 Claims, 3 Drawing Sheets

MULTI-DOPED SLAB SILICON OPTICAL MODULATOR

CROSS-REFERENCE TO RELATED APPLICATIONS

N/A

BACKGROUND OF THE INVENTION

The present invention relates to optical communication techniques. More particularly, the present invention provides a silicon optical modulator, a method for forming the silicon optical modulator with improved modulator bandwidth.

Over the last few decades, the use of communication networks exploded. In the early days Internet, popular applications were limited to emails, bulletin board, and mostly informational and text-based web page surfing, and the amount of data transferred was usually relatively small. Today, Internet, social network, mobile applications, and cloud computing demand a huge amount of bandwidth for transferring large amount of data such as photo, video, music, and other multimedia files. Most of traffic is coming from the consumer usage. For example, a social network like Facebook processes more than 500 TB of data daily. With such high demands on data and data transfer with high speed link not only between users and data centers but also within data centers, existing data communication systems need to be improved to address these needs.

Optical interconnect has shown improvement over electrical link. High data rates over 40-Gbit/s or 100-Gbit/s signal transmission through single-mode fiber is a target for the next generation of fiber-optic communication networks in which plenty of applications involve high speed silicon photonics devices. To improve the performance of the optical link there is a need to improve performance of the optical modulator. Due to the dense integration possibility and CMOS fabrication compatibility, silicon photonics is the best option to realize fast and miniaturized optical interconnect solution. There is always a need to improve silicon photonics based optical link performance. Particularly, improved optical modulator based on silicon photonics is desired with aims on overcoming trade-off between modulation efficiency, loss, and bandwidth.

BRIEF SUMMARY OF THE INVENTION

The present invention relates to optical telecommunication techniques. More particularly, the present invention provides an improved silicon optical modulator based multi-doped slab region to decrease the series resistance and enhance modulation bandwidth without sacrificing modulation efficiency or adding extra loss, applicable in various electro-optical modulator configurations in photonics system, though other applications are possible.

In an embodiment, the present invention provides a silicon optical modulator with improved bandwidth. The silicon optical modulator includes a silicon waveguide with a rib structure in cross section connected to a first slab region and a second slab region respectively on two opposite sides of the rib structure. The silicon optical modulator further includes a PN junction formed in the rib structure with a P-type part joined with the first slab region and a N-type part joined with the second slab region. Additionally, the silicon optical modulator includes multiple P-type doped sections formed one next to another in the first slab region ended with a first end region and multiple N-type doped sections one next to another formed in the second slab region ended with a second end region. The multiple P-type or N-type doped sections are configured with increasing doping levels for sections further away from the rib structure.

Optionally, the first end region is highly doped with P-type impurity to a level of about $1 \times 10^{20}$ cm$^{-3}$ as a P++ region.

Optionally, the first end region is highly doped with N-type impurity to a level of about $1 \times 10^{20}$ cm$^{-3}$ as a N++ region.

Optionally, the multiple P-type or N-type doped sections are configured to have decreasing lengths for sections further away from the rib structure.

Optionally, the rib structure has a height larger than either the first slab region or the second slab region. The P-part includes a first edge from a top of the rib structure to a top of the first slab region and the N-part includes a second edge from the top of the rib structure to a top of the second slab region.

Optionally, the first slab region has a total length of about 1.5 μm or less measured from the first edge of the P-part of the rib structure to the first end region.

Optionally, the second slab region has a total length of about 1.5 μm or less measured from the second edge of the N-part of the rib structure to the second end region.

Optionally, the P-type part comprises a part of the rib structure up to the first edge and a section of the first slab region naturally joined with the first edge, both in a doping level of about $1 \times 10^{17}$ cm$^{-3}$.

Optionally, the N-type part comprises a part of the rib structure up to the second edge and a section of the second slab region naturally joined with the second edge, both in a doping level of about $1 \times 10^{17}$ cm$^{-3}$.

Optionally, the multiple P-type doped sections and the multiple N-type doped sections are configured to optimize respective lengths and doping levels for corresponding sections with respective distances from the rib structure to minimize series resistances through respective total lengths of the first slab region and the second slab region.

In an alternative embodiment, the present invention provides a method for forming a silicon optical modulator with improved modulator bandwidth. The method includes a step of providing a silicon layer in a SOI substrate. The method further includes a step of forming a waveguide in the silicon layer with a rib structure in cross-section near a center region dividing a first slab region ended with a first end region and a second slab region ended with a second end region. Additionally, the method includes a step of forming a PN junction in the rib structure with a P-type part next to the first slab region and a N-type part next to the second slab region and forming a highly doped P++ region at the first end region and a highly doped N++ region at the second end region. Furthermore, the method includes a step of forming multiple sections in the first slab region with increasing P-type doping level away from the P-type part of rib structure towards the P++ region and forming multiple sections in the second slab region with increasing N-type doping level away from the N-type part of rib structure towards the N++ region.

Optionally, the step of forming the waveguide includes forming the rib structure with a first edge of a first height above the first slab region and a second edge of a second height above the second slab region.

Optionally, the step of forming the waveguide includes forming the first slab region with a total length measured from the first edge to the first end region and forming the second slab region with a total length measured from the second end to the second end region.

Optionally, the step of forming a PN junction in the rib structure includes doping a P- type impurity to a portion of the rib structure including a section of the first slab region beyond the first edge and doping a N-type impurity to a remaining portion of the rib structure including a section of the second slab region beyond the second edge.

Optionally, the step of forming the highly doped P++ region at the first end region includes implanting high dosage of P-type impurity to a level of about $1\times10^{20}$ cm$^{-3}$ and forming the highly doped N++ region at the second end region comprises implanting high dosage of N-type impurity to a level of about $1\times10^{20}$ cm$^{-3}$.

Optionally, the step of forming the multiple sections in the first slab region includes patterning the first slab region to define different lengths for the multiple sections one next to another with respective distances away from the first edge and implanting P-type impurity with increasing doping levels into the multiple sections with respective distances further away from the first edge, wherein a last section of the first slab region next to the P++ region has a doping level smaller than $1\times10^{20}$ cm$^{-3}$.

Optionally, the step of forming multiple sections in the first slab region with increasing P-type doping level away from the P-type part of rib structure towards the P++ region and forming multiple sections in the second slab region with increasing N-type doping level away from the N-type part of rib structure towards the N++ region includes optimizing different lengths and doping levels for different sections with corresponding distances away from the rib structure to minimize series resistances in the first slab region and the second slab region while without causing extra optical loss.

The present invention achieves these benefits and others in the context of known silicon photonics technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
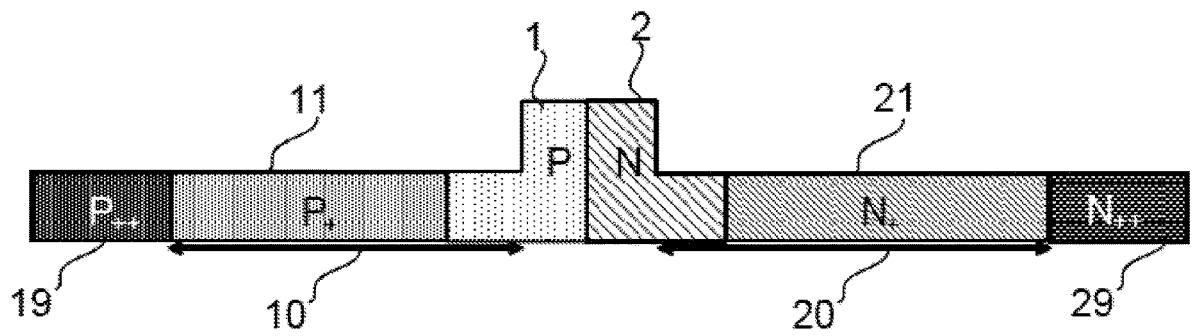
FIG. 1 is a schematic cross-sectional diagram of a silicon optical modulator in prior art.

The present invention relates to optical telecommunication techniques. More particularly, the present invention provides an improved silicon optical modulator based multi-doped slab region to decrease the series resistance and enhance modulation bandwidth without sacrificing modulation efficiency or adding extra loss, applicable in various electro-optical modulator configurations in photonics system, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, rib, slab, edge, and section have been used for convenience purposes only and are not intended to imply any particular fixed direction. Instead, they are used to reflect relative locations and/or directions between various portions of an object.

At the optical transmitter, the driver sends electrical 0s and 1s to the optical modulator. An analog signal converted by these 0s and 1s is digital signal is generated to drive the optical modulator to modulate phase and intensity of light. For silicon based optical modulator, plasma dispersion (free carrier) effect may be used to do the job as electro-refraction occurs though third order nonlinear dependency of the refractive index on electric field (Kerr effect) is weak in silicon. In free carrier effect, changes in carrier density varies the absorption and refractive index. Carrier injection to a guiding medium have speed limitations as the carrier lifetime is in order of a few nanosecond for III-V semiconductors and pure silicon. On the other hand, in the reversed-bias mode of operation where carriers are depleted instead of recombined, this speed limitation does not exist, but it requires the higher switching voltage. For example, the changes in the refractive index inside a silicon waveguide, can be used to modulate phase and intensity of the light. Silicon optical modulators configured as the interferometers such as Mach-Zehnder modulator or resonance-based devices like ring modulators are often used in the optical link.

FIG. 1 is a schematic cross-sectional diagram of a silicon optical modulator in prior art. As shown, a silicon waveguide is provided to form the silicon optical modulator. The silicon waveguide can be formed in a silicon layer of a silicon-on-insulator substrate. The silicon waveguide or the optical modulator based on thereof can have a finite length, which is not shown in this cross-sectional diagram, to define a phase associated with a branch of an interferometer or a ring modulator. In the cross-sectional view, the silicon waveguide has a rib structure at a center region dividing a first slab region 10 ended at a first end region 19 and a second slab region 20 ended at a second slab region 29. In particular, the silicon waveguide includes a PN junction formed by doping about half of the rib structure to P-type impurity to form a P-type part 1 and doping another half of the rib structure to N-type impurity to form a N-type part 2. Optionally, the P-type part 1 may include a small portion of the first slab region 10 and the N-type part 2 may include a small portion of the second slab region 20. Further, the first end region 19 is doped heavily with P-type impurity to form a P++ region and the second end region 29 is doped heavily with N-type impurity to form a N++ region. Optionally, the P++ region and the N++ region are respectively used for forming P and N electrodes for the PN junction to serve its modulation operation. Furthermore, a major slab portion 11 of the first slab region 10 can be doped to an intermediate P+ level, which is higher than the moderate level in P-type part 1, and a major slab portion 21 of the second slab region 20 can be doped to an intermediate N+ level, which is higher than the moderate level in N-type part 2.

Figure 2:
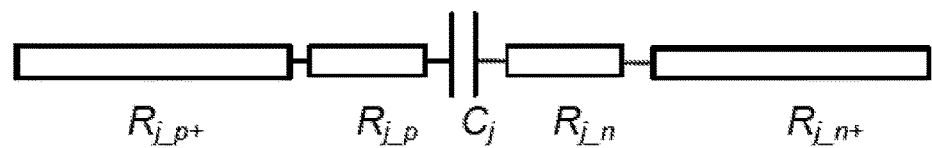
FIG. 2 is a schematic diagram of an equivalent circuit of the silicon optical modulator in FIG. 1.

The PN junction provides a mechanism for the charged carriers to be injected into the silicon waveguide to alter refractive index depending on changing electric field induced by change of electrical signals (0s or 1s is supplied by a driver). Along the cross-section of the silicon waveguide, the charged carries being subjected to an electric field that can be equivalently represented by a circuit, as shown in FIG. 2. At least partially, the circuit is given by a serial connection of a first resistor $R_{j\_p+}$, a second resistor $R_{j\_p}$, a capacitor $C_j$, a third resistor $R_{j\_n}$, and a fourth resistor $R_{j\_n+}$. As shown, the first resistor $R_{j\_p}^{+}$ represents a series resistance of the heavy doped P++ region 19. The second resistor $R_{j\_p}$ represents a series resistance of both the intermediate doped (P+) major portion 11 of the first slap region 10 and the moderate doped P-type part 1 including a small portion of the first slab region 10. The capacitor $C_j$ represents the PN junction. The third resistor $R_{j\_n}$ represents a series resistance of both the moderate doped N-type part 2 including a small portion of the second slab region and intermediate doped (N+) major portion 21 of the second slab region 20. Here, the major portion 11 of the first slab region is just a single section that is doped at the intermediate level of P-type doping, or higher than the moderate level in P-type part, between the P-type part of the PN junction and the P-type electrode formed with the P++ region, and the major portion 21 of the second slab region is a single section that is doped at the intermediate level of N-type doping, or higher than the moderate level in N-type part, between the N-type part of the PN junction and the N-type electrode formed with the N++ region. The intermediate doping level inside the slab region of the silicon waveguide help to reduce the series resistance and improve modulation bandwidth. However, the silicon optical modulator with a single section of the intermediate doping level in the slab region remains to be improved.

Accordingly, the present disclosure provides, inter alia, an optical modulator based on silicon waveguide in rib structure and multi-doped slab regions, and a method for making the same that substantially obviate one or more of the problems due to limitations and disadvantages of the related art.

Figure 3:
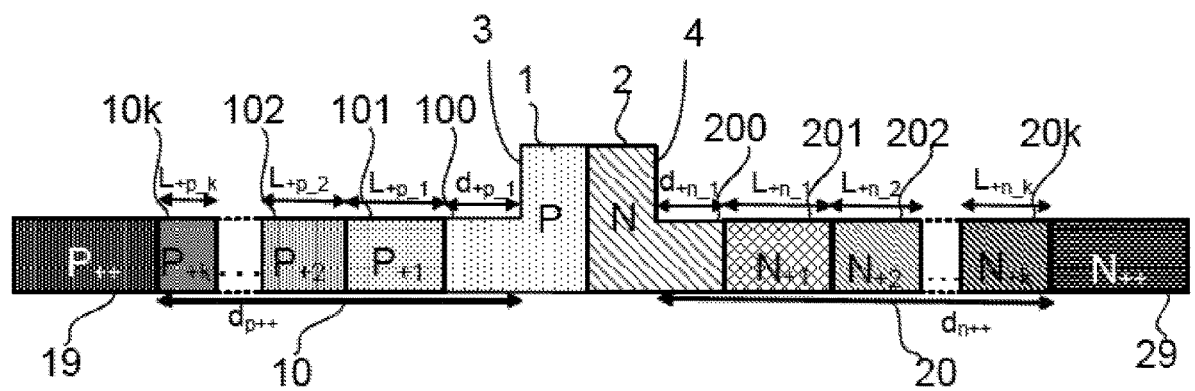
FIG. 3 is a schematic cross-sectional diagram of a silicon optical modulator according to some embodiments of the present disclosure.

In one aspect, the present disclosure provides a silicon optical modulator with improved modulation bandwidth without sacrificing modulation efficiency for high-speed communication network. FIG. 3 is a schematic cross-sectional diagram of a silicon optical modulator according to some embodiments of the present disclosure. This diagram is merely an example, which should not unduly limit the scope of the claims. One of ordinary skill in the art would recognize many variations, alternatives, and modifications. Referring to FIG. 3, the silicon optical modulator is also based on a silicon waveguide (optionally formed in a silicon layer of a silicon-on-insulator substrate) having a rib structure near a central region to join with a first slab region 10 on one side and a second slab region 20 on another side in horizontal direction. The first slab region 10 is ended with a first end region 19 and the second slab region 20 is ended with a second end region 29. Optionally, the rib structure has a portion higher in vertical direction than the first slab region 10 and the second slab region 20. Optionally, the first slab region 10 and the second slab region 20 can be a same height though it is not necessary or does not need to be precise. Optionally, the first end region 19 is a natural extension of the first slab region 10 and the second end region 29 is a natural extension of the second slab region 20. Optionally, the rib structure may not be symmetric relative to it center, or the distance from a first edge 3 of the rib structure to the first end region 19 may or may not be equal to the distance from a second edge 4 of the rib structure to the second end region 29.

In an embodiment, the rib structure of the silicon optical modulator includes a PN junction with a junction plane separating a part 1 of the rib structure near the first edge 3 and part 2 of the rib structure near the second edge 4. The part 1 of the rib structure is doped to a moderate level of P-type impurity and the part 2 of the rib structure is doped to a moderate level of N-type impurity, where the part 1 and part 2 joins together in the rib structure. Optionally, the part 1 of the rib structure also includes a small section 100 of the first slab region 10 beyond the first edge 3 with a section length denoted as $d_{+p\_1}$ from the first edge 3 and the part 2 of the rib structure includes a small section 200 of the second slab region 20 beyond the second edge 4 with a section length denoted as $d_{+n\_1}$ from the second edge 4.

In the embodiment, the first end region 19 of the silicon optical modulator is doped with heavy P++ level configured to form a contact region for a P-electrode. The second end region 29 of the silicon optical modulator is doped with heavy N++ level configured to form a contact region for N-electrode. The silicon optical modulator is driven by a driver to apply electrical signals via the P-electrode and the N-electrode to inject charge carriers into the PN junction to change refraction index thereof by changing electrical field for performing optical modulation.

In the embodiment, the first slab region 10 on one side of the rib structure of the silicon optical modulator includes multi-doped sections starting from a first section 101 with a doping level of $P_{+1}$ next to the small section 100 at the doping level of the P-type part 1 of rib structure, followed by at least a second section 102 with a doping level of $P_{+2}$, and optionally other sections up to a k-th section 10k with a doping level of $P_{+k}$ which is bounded to the first end region 19 at the doping level of P++. Particularly, the doping levels are increases sequentially following the order from the first section 101 to the k-th section 10k, i.e., P<$P_{+1}$<$P_{+2}$<. . . <$P_{+}k$ <$P_{++}$. On another side of the rib structure, the second slab region 20 also includes multi-doped sections starting from a first section 201 with a doping level of N+i next to the small section 200 at the doping level of the N-type part 2 of rib structure, followed by at least a second section 202 with a doping level of $N_{+2}$, and optionally other sections up to a k-th section 20k with a doping level of $N_{+k}$ which is bounded to the first end region 29 at the doping level of N++. Particularly, the doping levels are increases sequentially following the order from the first section 201 to the k-th section 20k, i.e., N<$N_{+1}$<$N_{+2}$<. . . <$N_{+k}$<$N_{++}$.

In the embodiment, the multi-doped sections in the first slab region 10 also have respective lengths denoted as $L_{+p\_1}$, $L_{+p\_2}$, . . . , $L_{+n\_k}$ corresponding to the sections 101, 102, . . . , 10k in order moving away from the first edge 3 of rib structure and the multi-doped sections in the second slab region 20 also have respective lengths denoted as $L_{+n\_1}$, $L_{+n\_2}$, . . . , $L_{+n\_k}$ corresponding to the sections 201, 202, . . . , 20k in order moving away from the second edge 4 of rib structure. By increasing the doping level in the slab region gradually as moving further away from the edge (3 or 4) of the rib structure, the optical loss increase is insignificant. Because light intensity is getting lower moving away from the rib region where optical mode is mostly confined, and optical mode will not be affected by free carrier absorption.

Figure 4:
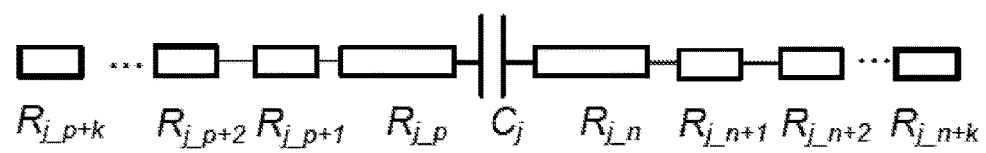
FIG. 4 is a schematic diagram of an equivalent circuit of the silicon optical modulator in FIG. 3 according to some embodiments of the present disclosure.

FIG. 4 is a schematic diagram of an equivalent circuit of the silicon optical modulator in FIG. 3 according to some embodiments of the present disclosure. The equivalent circuit, or at least a partial section of the circuit, of the silicon optical modulator is depicted as a series of resistors $R_{j\_p+k}$ representing respective multi-doped sections (section 1 through section k) in the first slab region, a P resistor $R_{j+p}$ representing the P-side of PN junction, a capacitor $C_j$ representing the PN junction, a N resistor $R_{j\_n}$ representing the N-side of the PN junction, and a series of resistors n+k representing multi-doped sections (section 1 through section k) in the second slab region. Particularly, these resistors are configured to have a following relationship of monotonic decreasing values for multi-doped sections further away from the rib structure: $R_{j\_n}$>$R_{j\_n-1}$>$R_{j\_n+2}$>. . . >$R_{j\_n+k}$ and $R_{j\_p}$>$R_{j\_p+1}$>$R_{j\_p+2}$> . . . $R_{j\_p+k}$ Naturally, longer the length of the section, larger the resistance. When k>1, more sections help reduce series resistance. But, too many sections may increase cost of manufacturing. Optionally, the slab design with multi- doped sections will help minimizing the series resistance in terms of the electrical contact connection to the PN junction. The length of each doped section, its distance to the edge of the rib structure, and its doping level should be optimized to get the minimum series resistance.

In order to keep optical loss low for the silicon optical modulator, the sum of lengths $L_{+p\_1}$+$L_{+p\_2}$+ . . . $L_{+n\_k}$, i.e., the total length $d_{p++}$ of the first slab region 10 measured from the first edge 3 to the highly P++dopped first end region 19 or the sum of lengths $L_{+n\_1}$+$L_{+n\_2}$+ . . . +$L_{+n\_k}$, i.e., the total length $d_{n++}$ of the second slab region 20 measured from the second edge 4 to highly N++ dopped the second end region 29 shall be kept as small as possible to get the optical loss minimized. But, it is cannot be too small to generate sufficient confinement effect to optical modes. Optionally, the total length $d_{n++}$ or $d_{n++}$ is about 1.5 μm or less or even as small as 1.0 or less. Optionally, the doping level is about $1\times10^{17}$ cm$^{-3}$ at the PN junction in the rib structure and about $1\times10^{20}$ cm$^{-3}$ at the highly dopped P++ or N++ end regions. The distance of the highly doped first/second end regions ($d_{p++}$ and $d_{n++}$) together with the intermediate doping sections with increasing doping levels from about $1\times10^{17}$ cm$^{-3}$ to about $1\times10^{20}$ cm$^{-3}$ in the slab region can be optimized to get a minimum excess optical loss as well as a minimum series resistance.

Optionally, the P and N side of the rib structure plus slab regions may or may not be symmetric in terms of the distance and length and doping level of the multi-intermediate doping sections. Comparing to conventional slab modulator with single intermediate doping section, the multi-doped slab modulator has advantages on improved modulator bandwidth as its series resistance is reduced. By optimizing the length of each doped section, its distance to the edge of the rib structure, and its doping level, the modulation bandwidth can be improved without sacrificing modulation efficiency or adding extra optical loss.

Optionally, the silicon optical modulator according to some embodiments of the present disclosure can be implemented in various electro-optical modulator configurations such as Mach-Zehnder (MZ) and ring modulator configured to change the refractive index inside the waveguide to modulate phase and intensity of the light through the waveguide.

Figure 5:
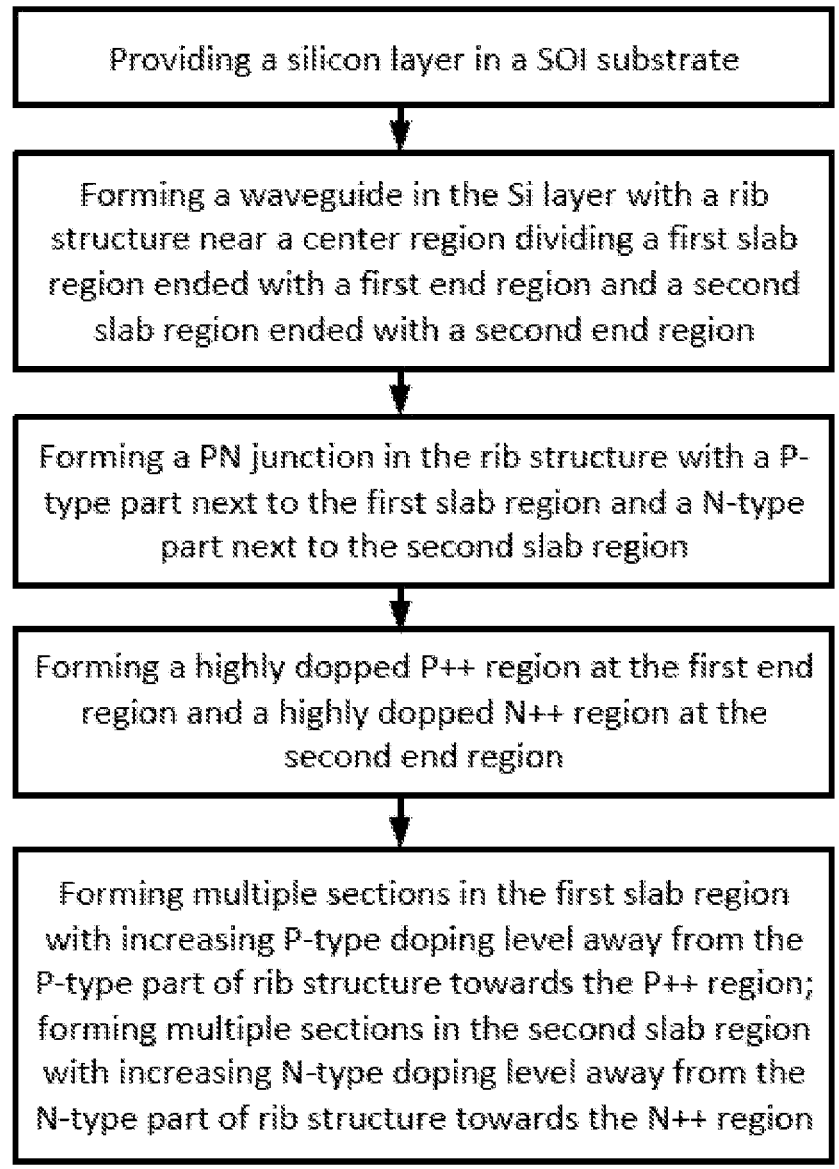
FIG. 5 is a flow chart of a method for forming a silicon optical modulator with improved bandwidth according to an embodiment of the present disclosure.

In an alternative aspect, the present disclosure provides a method for forming a silicon optical modulator with improved modulator bandwidth without sacrificing modulation efficiency. FIG. 5 shows a flow chart of the method according to an embodiment of the present disclosure. This diagram is merely an example, which should not unduly limit the scope of the claims. One of ordinary skill in the art would recognize many variations, alternatives, and modifications. Referring to FIG. 5, the method includes a step of providing a silicon layer in a silicon-on-insulator (SOI) substrate. SOI substrate is widely used in manufacturing of silicon photonics devices including modulator, combiner, wavelength locker, wavelength tuner, etc. Both MZ modulator and ring modulator can be fabricated based on the silicon layer on SOI substrate.

Referring to FIG. 5, the method also includes a step of forming a waveguide in the silicon layer with a rib structure in cross-section near a center region dividing a first slab region ended with a first end region and a second slab region ended with a second end region. Optionally, the rib structure has a first edge with a first height above the first slab region and a second edge with a second height above the second slab region. Optionally, the second height is equal to the first height. Optionally, the first height and the second height are different.

Optionally, the rib structure has a flat top with a width substantially smaller than that of either one of the first slab region and the second slab region. Optionally, the rib structure provides an optical confinement effect for light waves traveling through it, making less and less optical power in the slab as it is further away from the first/second edge of the rib structure to the first/second end region.

Referring to FIG. 5, the method additionally includes a step of forming a PN junction having a P-type part joined with a N-type part in the rib structure, the P-type part being next to the first slab region and the N-type part being next to the second slab region. The PN junction is formed via a patterned ion-implantation process which allows precisely defining a first part of the rib structure next to the first slab region to be a P-type part and defining a second (remaining) part of the rib structure next to the second slab region to be a N-type part. Optionally, the P-type part includes a small section of the first slab region next to the rib structure. Optionally, the N- type part includes a small section of the second slab region next to the rib structure. The patterned ion-implantation process also allows a precision doping level of P-type impurity into the P-type part and a precision doping level of N-type impurity into the N-type part. Optionally, the doping level of the P-type part or the N-type part is a moderate $1\times10^{17}$ cm$^{-3}$. Optionally, the length and the doping level of the P-type part and N-type part may or may not be formed in symmetric form relative to the PN junction plane. Optionally, the length of the first slab region next to the P-type part and the length of the second slab region next to the N-type part may or may not be formed in symmetric form relative to the rib structure.

Referring to FIG. 5 again, the method further includes a step of forming a highly dopped P++ region at the first end region and a highly dopped N++ region at the second end region. Optionally, this step is formed by a same or similar patterned ion-implantation process used in the step of forming the PN junction. Optionally, the doping level of the P++ impurity in the first end region and the N++ impurity in the second end region is about $1\times10^{20}$ cm$^{-3}$. Optionally, the highly dopped first end region and the second end region are respectively used for forming a P-type contact region and a N-type contact region. The P-type contact region may be bounded with a metal to form a first electrode and the N-type contact region may be bounded with a metal to form a second electrode for applying bias voltage to changing electric field in the PN junction.

Referring to FIG. 5, the method furthermore includes a step of forming multiple sections in the first slab region with increasing P-type doping level away from the P-type part of rib structure towards the highly doped P++region and forming multiple sections in the second slab region with increasing N-type doping level away from the N-type part of rib structure towards the highly doped N++ region. Again, this step can be executed using the patterned ion-implantation process. For each of the first slab region and the second slab region, multiple sections with different lengths and different distances away from the rib structure are defined according to a certain optimized configuration. Optionally, the defined length of respective section in the first slab region may not be formed in symmetric way as the defined length of respective section in the second slab region. For example, the length value of a section in the first slab region decreases as the distance of the section is further away from the rib structure based on a first optimized configuration. The length value of a section in the second slab region decreases as the distance of the section is further away from the rib structure based on a second optimized configuration. Optionally, a first ion-implantation process is performed to execute a precision doping to make the multiple sections in the first slab region as multi-doped sections thereof. Each section in the first slab region is doped in P-type with different doping level based on a certain optimized doping profile along the whole length of the first slab region. Optionally, a second ion-implantation process is performed to execute a precision doping to make the multiple sections in the second slab region as multi-doped sections thereof. Each section in the second slab region is doped in N-type with different doping level based on a certain optimized doping profile along the whole length of the second slab region. Optionally, the first ion-implantation process may or may not be designed in a same way and the resulted doping levels in respective sections in the first and the second slab regions may or may not be symmetric. In fact, first ion-implantation process and the second implantation process are designed to tune all mechanical/electrical parameters like the length of each section, the distance of each section away from the rib structure, and the doping level of each section to yield a minimized series resistance and a minimized optical loss to achieve a best result in modulator bandwidth.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. An optical modulator comprising:
    a substrate;
    a PN junction disposed on the substrate, the PN junction formed by a first L-shaped region doped with a p-type doping abutting a second L-shaped region doped with an n-type doping;
    a first plurality of regions doped with the p type doping arranged adjacent to the first L-shaped region on the substrate, the first plurality of regions having respective increasing doping levels and decreasing lengths as distances of the first plurality of regions increase from the first L-shaped region;
    a second plurality of regions doped with the n type doping arranged adjacent to the second L-shaped region on the substrate, the second plurality of regions having respective increasing doping levels and decreasing lengths as distances of the second plurality of regions increase from the second L-shaped region.

2. The optical modulator of claim 1 wherein:
    the first L-shaped region includes (i) a first portion having a first height and (ii) a second portion extending perpendicularly from the first portion and having a second height that is greater than the first height;
    the second L-shaped region includes (i) a third portion having a third height and (ii) a fourth portion extending perpendicularly from the third portion and having a fourth height, the fourth portion abutting the second portion to form the PN junction;
    the first plurality of regions have the first height and are arranged adjacent to the first portion of the first L-shaped region;
    the second plurality of regions have the third height and are arranged adjacent to the third portion of the second L-shaped region; and
    the first portion of the first L-shaped region, the third portion of the second L-shaped region, the first plurality of regions, and the second plurality of regions lie in a plane parallel to the substrate.

3. The optical modulator of claim 2 wherein the third height is equal to the first height and the fourth height is equal to the second height.

4. The optical modulator of claim 1 wherein:
    respective electrical resistances among regions of the first plurality of regions decrease monotonically as the distances of the first plurality of regions increase from the first L-shaped region; and
    respective electrical resistances among regions of the second plurality of regions decrease monotonically as the distances of the second plurality of regions increase from the second L-shaped region.

5. The optical modulator of claim 1 wherein each region among the first plurality of regions is of the same length as a corresponding region among the second plurality of regions that is located at the same distance from the PN junction.

6. The optical modulator of claim 1 wherein the PN junction is centered between the first and second plurality of regions.

* * * * *